United States Patent [19]

Taig

[11] 4,241,643
[45] Dec. 30, 1980

[54] POWER ASSISTED ACTUATING ARRANGEMENTS

[75] Inventor: Alistair G. Taig, South Bend, Ind.

[73] Assignee: Bendix Westinghouse Limited, Britol, England

[21] Appl. No.: 883,548

[22] Filed: Mar. 6, 1978

[30] Foreign Application Priority Data

Mar. 5, 1977 [GB] United Kingdom ............... 09405/77

[51] Int. Cl.³ ..................... F15B 13/042; F15B 13/10
[52] U.S. Cl. .......................................... 91/446; 91/51; 91/391 R
[58] Field of Search ............ 91/375 R, 375 A, 376 A, 91/51, 391 R, 446

[56] References Cited

U.S. PATENT DOCUMENTS

| | | | |
|---|---|---|---|
| 1,952,806 | 3/1934 | Hyland | 91/51 |
| 2,216,800 | 10/1940 | Baldenhofer | 91/391 R |
| 2,968,189 | 1/1961 | Walko | 91/391 R |
| 3,552,517 | 1/1971 | Nordeen | 91/375 R |
| 3,905,275 | 9/1975 | Saida et al. | 91/375 R |

*Primary Examiner*—Paul E. Maslousky
*Attorney, Agent, or Firm*—Paul D. Schoenle; Ken C. Decker

[57] ABSTRACT

A power steering device includes a housing which journals coaxial input and output shafts. Drivingly connected to the input shaft is an eccentric which rotatably carries a gear wheel. The gear wheel is prevented from rotating in the housing so that it gyrates when the input shaft rotates. An internally toothed ring meshes with the gear wheel and is drivingly connected to the output shaft. The internally toothed ring defines a greater number of gear teeth than does the gear wheel so that gyration of the gear wheel incident to the rotation of the input shaft drives the output shaft via the internally toothed ring. A valve device is responsive to rotation of the input shaft relative to the output shaft to control fluid flow to and from a fluid motor. The fluid motor is coaxial with and drivingly connected to the output shaft so as to increase the torque derivable from the output shaft incident to rotation of the input shaft.

9 Claims, 6 Drawing Figures

POWER ASSISTED ACTUATING ARRANGEMENTS

This invention relates to power assisted actuating arrangements, and more especially but not exclusively to power assisted steering arrangements.

In the art of power assisted steering arrangements, there have been previous proposals by which the torque applied to an input shaft is hydraulically amplified and applied to an output shaft such that the tendency of the input shaft to rotate the output shaft either directly or through the intermediary of gearing means is augmented by the hydraulic power. The present invention proposes, in two of its embodiments, improved forms of such an arrangement, incorporating reduction gearing and utilising the reaction on part of the power train between the input and output shafts to control the hydraulic power.

According to the present invention there is provided a power assisted actuating arrangement comprising a body member, an input shaft rotatable relative to said body member, an eccentric coupled to or integral with said input shaft and rotatable therewith, a gear-wheel rotatably mounted on said eccentric, said gear-wheel meshing with an internally-toothed ring rotatably mounted in said body member and having a number of gear teeth which is greater than the number of gear teeth on said gear-wheel, said ring being coupled to or integral with an output shaft of said arrangement rotatably mounted in said body member, means for constraining rotation of said gear-wheel upon gyration thereof due to rotation of said eccentric whereby rotation of the eccentric is accompanied by rotation of said ring, torque sensing means operable to produce in use a fluid pressure or fluid flow dependent on the torque applied to said input shaft, and fluid pressure motor means coupled to or forming part of said ring and said body member and responsive to said fluid pressure or flow in a sense to enhance torque derivable from said output shaft in response to rotation of the input shaft.

Said means for constraining rotation of said gear-wheel may comprise anchor means for anchoring said gear-wheel such as to permit gyration thereof while substantially preventing rotation thereof about its axis relative to the body member. Said anchor means may comprise an arm rigidly secured to the gear-wheel and extending radially outwards from the gear-wheel, the other end of the arm or a portion of the arm near said other end being constrained against lateral movement while being substantially free for axial and rotational movement to accommodate said gyration of the gear-wheel.

Alternatively said means for constraining rotation of the gear-wheel may comprise a further internally-toothed ring coupled to or forming part of said body member thereby to be substantially non-rotatable with respect to said body member, said further ring having a number of gear teeth which is different from the number of gear teeth on the first said ring, the teeth on said further ring meshing with said gear-wheel or meshing with a further gear-wheel coupled to or integral with the first said gear-wheel for conjoint rotation therewith.

Said torque sensing means may comprise fluid flow control means operable to vary the relative flows of fluid escaping from two passages or two groups of connected passages. Said torque sensing means may form the constraint of said arm, the leverage at the point of constraint of said arm effecting relative opening and closing of the two passages. Alternatively said torque sensing means may rotationally couple the input shaft to the eccentric, in which case the torque sensing means preferably takes the form of the power assistance control device described in United Kingdom Pat. No. 1,431,437 or as described in United Kingdom Patent Application No. 10607/76.

Said fluid is preferably a substantially inelastic hydraulic oil, and said fluid pressure motor means is preferably a hydraulic motor means.

Said fluid pressure motor means may take any suitable form, and preferably takes the form of a generally annular vane motor means having one or more vanes preferably directly coupled to or forming part of the output shaft whereby the fluid power output of said motor means is directly applied to the output shaft and not via the gearing between the input shaft and the output shaft.

In order that the invention may be more clearly understood and readily put into effect, preferred embodiments of the same will now be described by way of examples, with reference to the accompanying drawings wherein.

Figure 1:
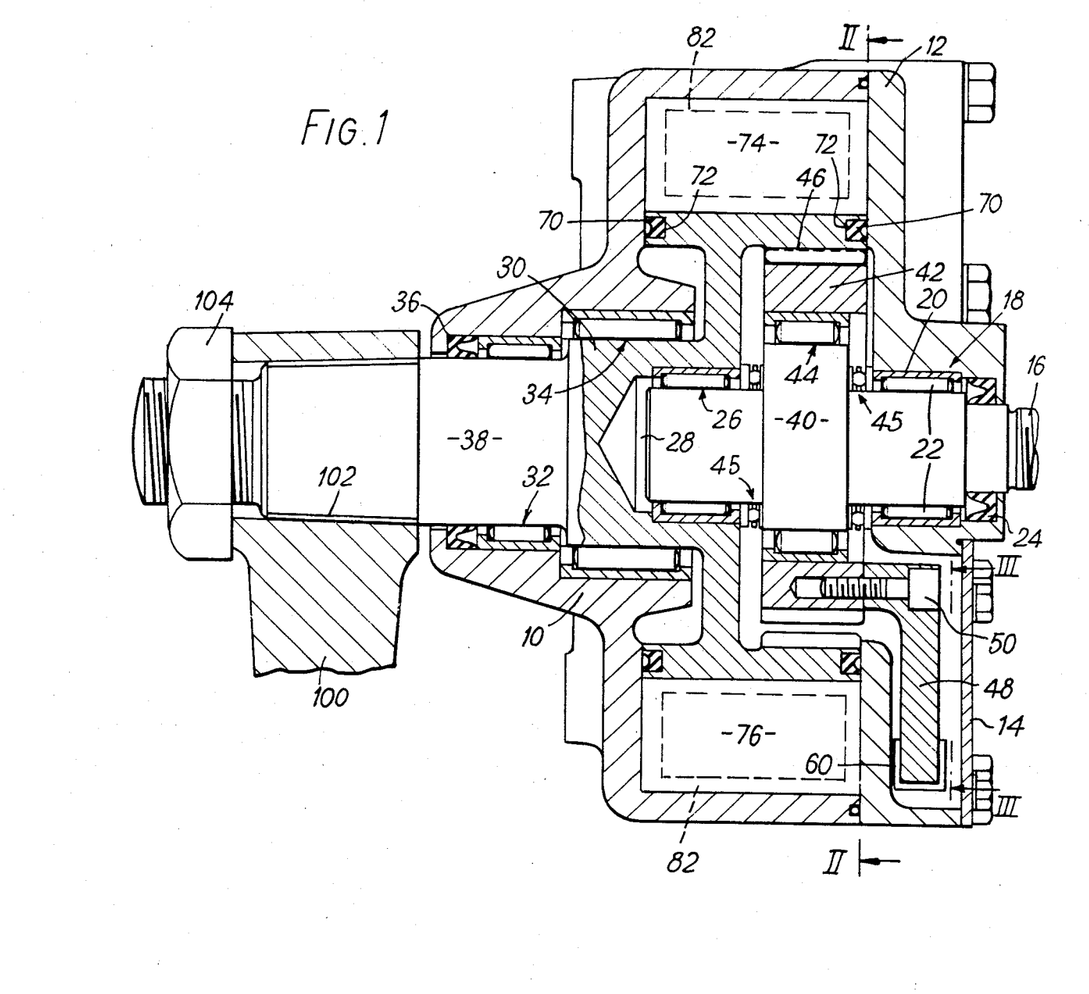
FIG. 1 is a cross-section in a vertical plane through the central axis of the first embodiment (on the line I—I in FIG. 2)

Referring first to FIG. 1, the first embodiment of power assisted actuating arrangement in accordance with the invention comprises a body member formed of a first generally circular cast or moulded or machined casing 10, a second casing 12, and a cover plate 14. An input shaft 16 is rotatably mounted in the casing 12 by means of a needle-roller bearing 18 of known form (in this case having an outer race 20, a complement of caged needle rollers 22, and no inner race, but the rollers 22 instead bearing on a suitably finely ground and hardened cylindrical surface of the input shaft 16). An elastomeric seal 24 of known form serves to seal the shaft 16 against fluid leakage at its point of entry into the casing 12. The other end of the input shaft 16 is rotatably mounted by means of a bearing 26 of similar form to the bearing 18, in a bore 28 in an output member 30 of the arrangement (subsequently to be described in detail). The output member 30 is rotatably mounted in the casing 10 by means of roller bearings 32 and 34, each of similar form to the bearing 18. A seal 36 of similar form to the seal 24 seals an output shaft 38 of the arrangement against fluid leakage at it point of exit from the casing 10, the output shaft 38 being integral with output member 30.

Integral with the input shaft 16 is an eccentric 40 upon which a gear-wheel 42 is rotatably mounted by means of a roller bearing 44 of generally similar form to the bearing 18. Axial movement of the eccentric 40 and hence of the input shaft 16 is constrained by a pair of axial thrust bearings 45.

Integral with the output member 30 is an internally-toothed ring 46 which has a slightly greater number of gear teeth than the number of gear teeth on the gear-wheel 42. Although the pitch circle diameter of the gear teeth of the ring 46 is greater than the pitch circle diameter of the gear teeth on the gear-wheel 42, because of the eccentricity of the eccentric 40 the axis of rotation of the gear-wheel 42 is offset from the axis of the ring 46 (which is co-axial with the input shaft 16) by an amount sufficient that the gear teeth on the gear-wheel 42 mesh with the gear teeth of the ring 46 as may be seen in the upper parts of FIGS. 1 and 2.

Figure 2:
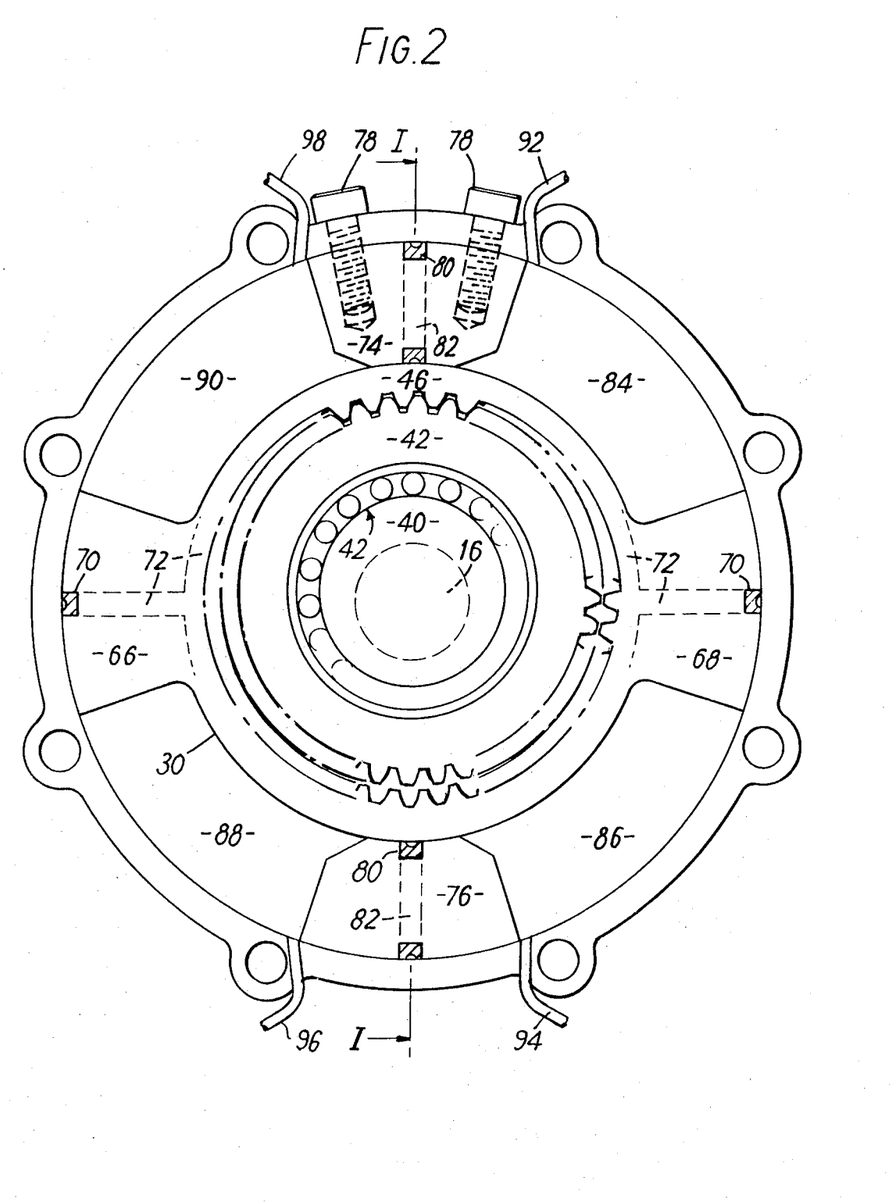
FIG. 2 is a transverse cross-section of the first embodiment in a plane at right angles to the plane of the section of FIG. 1 (on the line II—II in FIG. 1)

Each revolution of the input shaft 16 and hence of the eccentric 40 causes the gear-wheel 42 to gyrate without rotating once round the inside of the ring 46 such that a given gear tooth on the gear-wheel 42 meshes with a gear tooth on the ring 46 which is displaced from the tooth meshed before the revolution by the difference in gear teeth numbers of the gear-wheel 42 and the ring 46. Such a difference may take any suitable value, and as shown in the drawings, is equal to two in this first embodiment.

Figure 3:
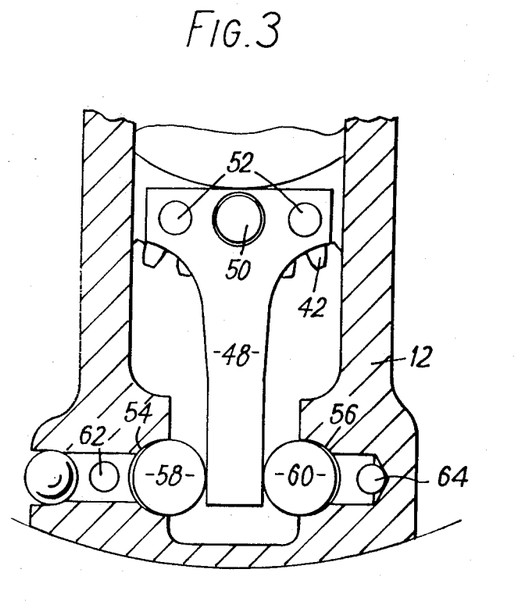
FIG. 3 is a part section of the first embodiment in the same direction of view as FIG. 2 (on the line III—III in FIG. 1)

So as to convert rotation of the input shaft 16 into rotation of the output shaft 38, the gear-wheel 42 is allowed substantially free gyration but is constrained against substantial rotation about its axis by means of an anchor in the form of a rigid arm 48 rigidly attached by a screw 50 and pins 52 to the gear-wheel 42, the arm 48 extending radially outwards of the gear-wheel 42. Reference now to FIG. 3 will show how the arm 48 is constrained at or near to outer end against substantial lateral movement while being substantially free to move axially and rotationally to accommodate gyration of the gear-wheel 42. Half-cylindrical pockets 54 and 56 in the casing 12 respectively accommodate rollers 58 and 60, and the arm 48 is disposed between the rollers 58 and 60, touching each of them. The sum of the radii of the rollers 58 and 60 and of the radially constant lateral width of the arm 48 at its points of contact with the rollers 58 and 60 is slightly less than the distance between the axes of the half-cylindrical pockets 54 and 56. Thus a slight but not substantial lateral movement of the arm 48 may occur, clockwise rotation of the arm 48 forcing the roller 58 into the pocket 54 while permitting the roller 60 to come slightly out of the pocket 56, and conversely, anticlockwise rotation of the arm 48 forcing the roller 60 into the pocket 56 while permitting the roller 58 to come slightly out of the pocket 54. Since the arm 48 prevents substantial rotation of the gear-wheel 42, (while being free to slide axially and tilt between the rollers 58 and 60 to accommodate the gyratory movement of the gear-wheel 42) it will be seen that clockwise rotation of the input shaft 16 (as viewed in FIG. 2) causes clockwise rotation of the output shaft 38 and the reaction on the gear-wheel 42 therefore causes a rightward force on the end of the arm 48 to force the roller 60 into the pocket 56 while permitting the roller 58 to come slightly out of the pocket 54. Conversely anti-clockwise rotation of the input shaft 16 (as viewed in FIG. 2) causes anticlockwise roation of the output shaft 38 and the reaction on the gear-wheel 42 therefore causes a leftward force on the end of the arm 48 to force the roller 58 into the pocket 54 while permitting the roller 60 to come slightly out of the pocket 56. Because the gear-wheel 42 non-rotatably gyrates within the ring 46 and the numbers of gear teeth on the gear-wheel 42 and the ring 46 differ only slightly, many revolutions of the input shaft 16 cause only a fractional revolution of the output shaft 38 and hence a substantial mechanical advantage (torque multiplication) is obtained between the input shaft 16 and the output shaft 38.

The pockets 54 and 56, and the rollers 58 and 60 serve a purpose additional to constraining the arm 48, this additional purpose being the control of relative fluid flows out of passages 62 and 64 respectively leading pressurised fluid such as hydraulic oil to the pockets 54 and 56. As above described, the reaction of the gear-wheel 42 forces either the roller 58 into the pocket 54 or forces the roller 60 into the pocket 56 while allowing in each case the respective other roller to come slightly out of its respective pocket, according to the direction of rotation of the input shaft 16. Considering the case of anticlockwise reaction on the gear-wheel 42 (caused by clockwise rotation of the input shaft 16) producing a rightward force on the arm 48, the roller 60 will be forced into the pocket 56 thereby to inhibit or block the passage of hydraulic oil out of the passage 64 and thereby maintain a relatively high hydraulic pressure in the passage 64, while at the same time allowing the roller 58 to come slightly out of the pocket 54 thereby to allow relatively free flow of hydraulic oil out of the passage 62 past the roller 58 and thereby also to maintain a relatively low hydraulic pressure in the passage 62. Conversely, considering the case of clockwise reaction on the gear-wheel 42 (caused by anticlockwise rotation of the input shaft 16) producing a leftward force on the arm 48, the roller 58 will be forced into the pocket 54 thereby to inhibit or block passage of hydraulic oil out of the passage 62 and thereby maintain a relatively high hydraulic pressure in the passage 62, while at the same time allowing the roller 60 to come slightly out of the pocket 56 thereby to allow a relatively free flow of hydraulic oil out of the passage 64 past the roller 60 and thereby also to maintain a relatively low hydraulic pressure in the passage 64. Thus the oil flows from, and the hydraulic pressures in the passages 62 and 64 vary relative to each other according to the direction of rotation of the input shaft 16. (Oil thus entering the bottom of the casing 12 is drained by any suitable means, for example by a suction pump (not shown)).

This input torque sensing hydraulic control function is used directly or indirectly to power a hydraulic motor (about to be described) in a sense to enhance the torque exerted on the output shaft 38 by rotation of the input shaft 16 thereby to exert a power assistance function.

Integral with the output member 30 (and hence also integral with the output shaft 38) are a pair of diametrically opposed vanes 66 and 68 movable within a rectangular cross-section annular volume defined by the casings 10 and 12, and by the cylindrical peripheral surface of the member 30. An elastomeric seal 70 lying within a partly axial, partly radial, and partly circumferential groove 72 substantially prevents the leakage of pressurised hydraulic oil past the vanes 68 and 70, and also radially inwards past the member 30. Also disposed within this annular volume are a pair of diametrically opposed static vanes 74 and 76 rigidly secured to the casing 10 (for example, by screws 78). Elastomeric seals 80 in peripheral grooves 82 in the vanes 74 and 76 substantially prevent the leakage of pressurised hydraulic oil past the static vanes 74 and 76. The vanes 66, 68, 74 and 76 sub-divide the aforesaid annular volume into four volumes 84, 86, 88 and 90 (FIG. 2). Leading to the volumes 84, 86, 88 and 90 are respective hydraulic conduits 92, 94, 96 and 98 (FIG. 2). The conduits 92 and 96 are connected together to couple the volumes 84 and 88, and the conduits 94 and 98 are connected together to couple the volumes 86 and 90. Thus the combination of the vanes 66, 68, 74 and 76, the casings 10 and 12, and the member 30 form a pressure-balanced double-vane hydraulic motor.

One possible method of powering the thus formed hydraulic motor is to force hydraulic oil from a suitable pump (not shown) via respective restrictions (not shown) to the passages 62 and 64, and to couple the passage 64 to the conduits 92 and 96, and similarly to couple the passages 62 to the conduits 94 and 98. Thus, as above described in detail, clockwise rotation of the input shaft 16 produces a relatively low pressure in the passage 62 and hence also a relatively low pressure in the volumes 86 and 90 while simultaneously producing a relatively high pressure in the passage 64 and hence also a relatively high pressure in the volumes 84 and 88. These pressures act in the motor to produce in known manner a net clockwise torque augmenting the clockwise torque of the output shaft 38 caused by clockwise rotation of the input shaft 16. The converse obviously applies for anticlockwise rotation of the input shaft 16.

An alternative method of powering the hydraulic motor is to utilise either or both the relative pressure and flow differences prevailing in the passages 62 and 64 upon rotation of the input shaft 16 to actuate a known form of fluid flow divider (not shown), output pressures from which are coupled via the conduits 92 and 96, and 94 and 98 to the volumes 84 and 88, and 86 and 90, respectively, to power the hydraulic motor. Suitable forms of fluid flow divider for this purpose are described with reference to FIG. 16 of United Kingdom patent specification No. 1431437, and also in United Kingdom patent application No. 14889/75.

One practical use for the arrangement described above is as a vehicle power steering unit. In such use, the arrangement would be securely fastened to the chassis of the vehicle, the input shaft 16 would be coupled to the lower end of the steering column at the upper end of which would be the vehicle driver's steering wheel, a vehicle engine-driven hydraulic pump would be coupled to the passages 62 and 64 and also to the flow divider (if employed), and the output shaft 38 would have secured thereto one end of the drop arm 100, the arm 100 being secured to the shaft 38 via taper spline 102 and a nut 104, and the other end of the arm 100 (not shown) being coupled by drag links (not shown) to the steerable wheels of the vehicle. The hydraulic power provided by the arrangement would augment the driver's steering effort. Other practical uses are in situations where a rotary control effort requires to effect a high output torque, such as for the operation of water control valves and jet guides in hydro-electric power stations.

Figure 4:
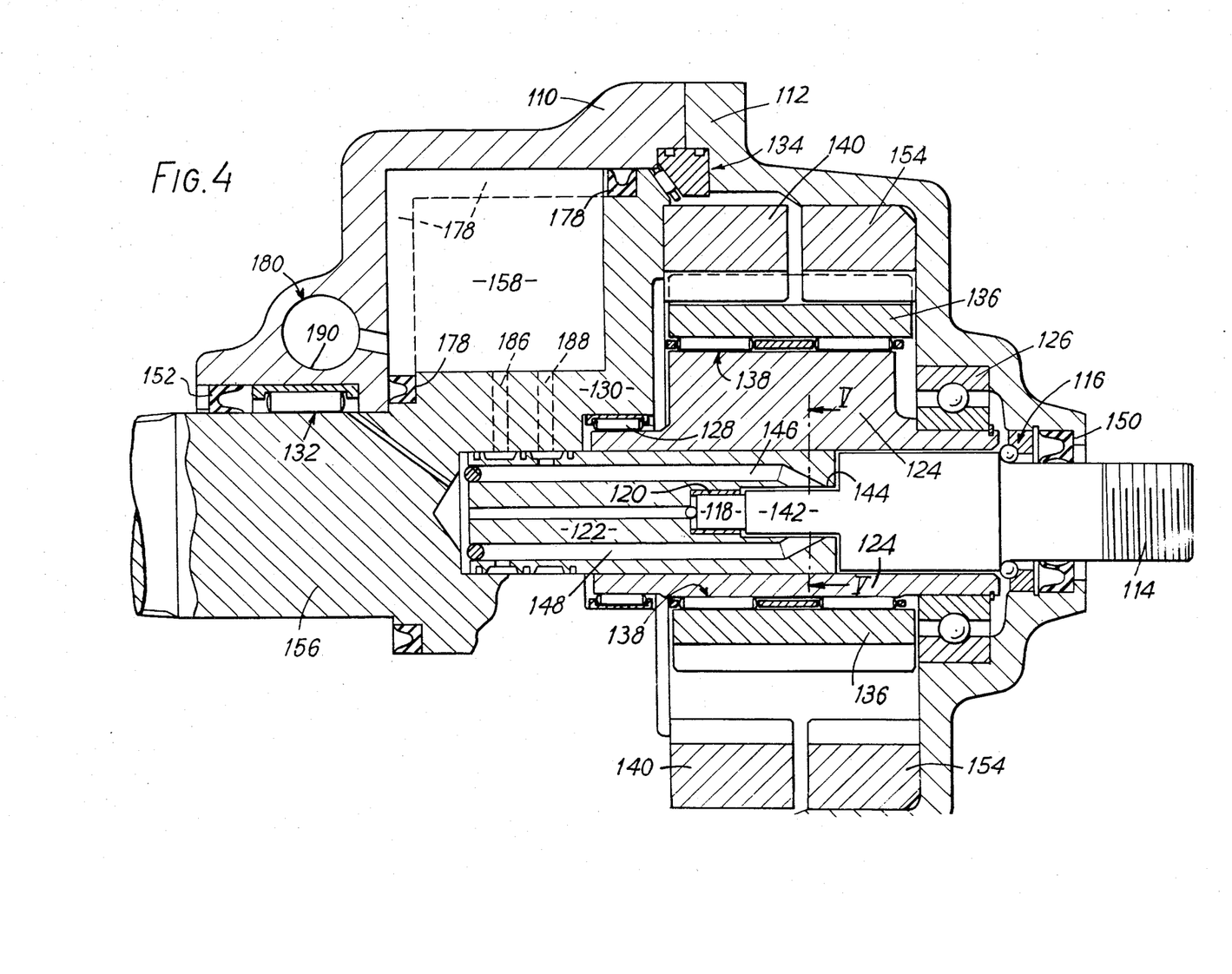
FIG. 4 is a cross-section in a vertical plane through the central axis of the second embodiment.
Figure 5:
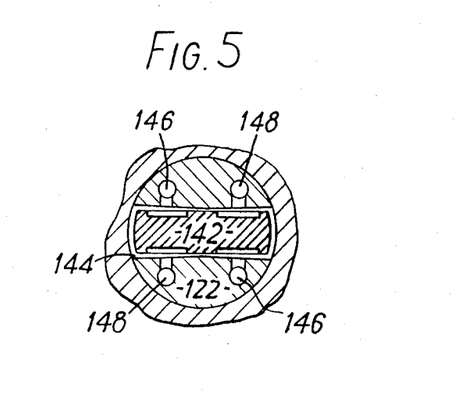
FIG. 5 is a transverse cross-section of part of the second embodiment in a plane at right angles to the plane of the section of FIG. 4 (on the line V—V in FIG. 4)
Figure 6:
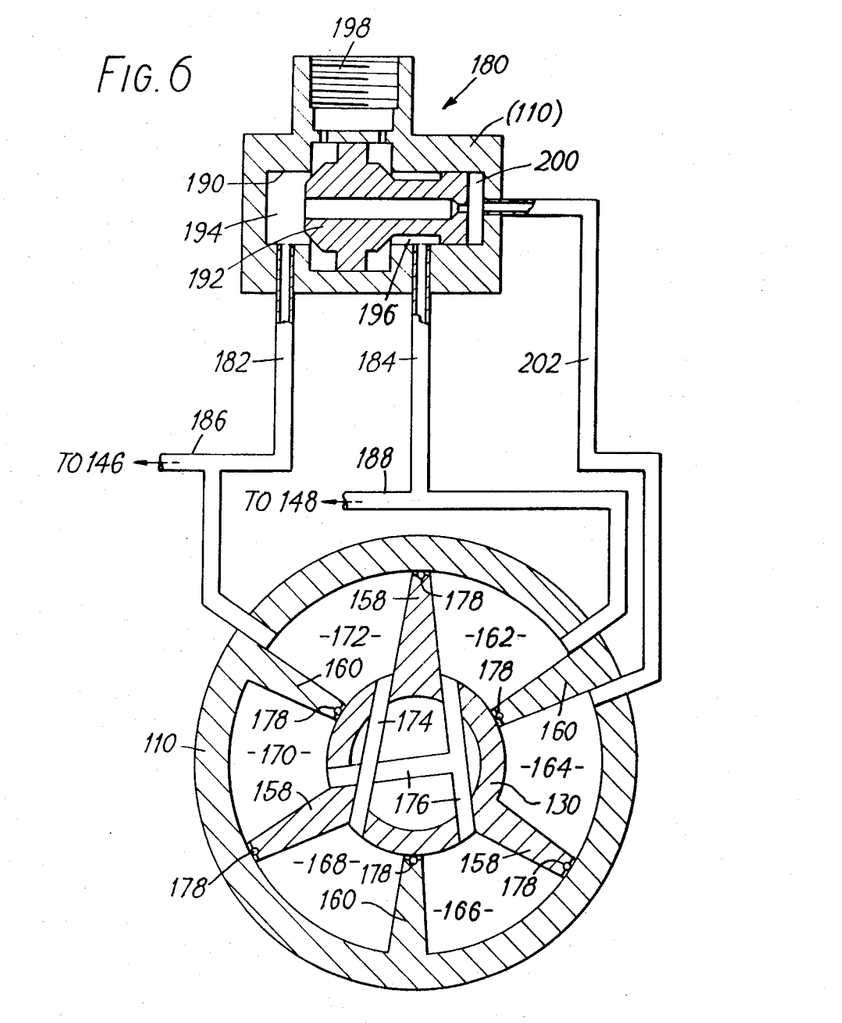
FIG. 6 is a cross-section (not to scale) of parts of the second embodiment.

Referring now to FIGS. 4–6, these illustrate the second preferred embodiment, the general principle of which is similar to the first embodiment, but which differs in the details of how gyratory motion of a gear-wheel gyrated by rotation of an input shaft is converted to rotation of an output shaft, and also in the details of means by which input torque is sensed.

Referring initially to FIG. 4, this is a cross-section of a power assistance arrangement in accordance with the invention, and corresponds to the sectional view of FIG. 1. The second embodiment comprises a first cast or moulded or machined casing 110, and the second casing 112 secured together to form the housing of the arrangement. An input shaft 114 is rotatably mounted in the casing 112 by means of an angular contact single row ball bearing 116 and a pilot shaft extension 118 journalled in a bush 120 in an input member 122 (about to be described). The input member 122 is rotatable by the input shaft 114 (as will subsequently be described with reference to FIG. 5), and the member 122 has secured thereto an eccentric 124. The member 122 is supported radially and axially for rotational movement (co-axial with the input shaft 114) by means of a ball bearing 126 mounted in the casing 112 and also by a roller bearing 128 supported by a co-axially rotatable output member 130 (subsequently to be described). The output member 130 is supported for rotational movement by a needle roller bearing 132 mounted in the casing 110 and also by an angular contact roller bearing 134 held between the casings 110 and 112.

A gear-wheel 136 is rotatably mounted on the eccentric 124 by a double-row needle roller bearing 138 and has thirtyfive gear teeth.

Secured to the output member 130 is an internally toothed ring 140 having forty-two gear teeth. Although the pitch circle diameter of the gear-wheel 136 is only five-sixths of the pitch circle diameter of the ring 140, because of the eccentricity of the eccentric 124, the gear teeth on the gear-wheel 136 and on the ring 140 mesh as shown at the uppermost part of the gear-wheel 136.

The portion 142 of the input shaft 114 is a tongue (see FIG. 5, which is a cross-section on the line V—V in FIG. 4) which lies within a slightly angularly wider slot 144 formed in the right end of the input member 122. Cross-coupled hydraulic passages 146 and 148 in the input member 122 have their open ends lying within the slot 144, such that application of torque to the input shaft 114 causes the tongue 142 to rock within the slot 144 and cause relative differences in the flows of pressurised fluid, such as hydraulic oil, out of the passages 146 and 148 thereby to effect an hydraulic control function. The input torque sensing arrangement formed thereby is more fully described in United Kingdom patent application No. 10607/76, and further and fuller details of the operation of such an hydraulic control valve may be had by reference to United Kingdom Pat. No. 1431437. (The latter Patent describes a slightly different version of a torque sensing hydraulic control valve which may be employed as an alternative to that shown in FIGS. 4 and 5). The pressures at the ends of the passages 146 and 148 react on the tongue 142 to cause rotation of the input shaft 114 to be matched by rotation of the input member 122. (In the event of hydraulic pressure failure, rotation of the input shaft 114 will cause the tongue 142 mechanically to lock-up inside the slot 144 with a small amount of lost motion, and thus in all circumstances rotation of the input shaft 114 is substantially matched by rotation of the input member 122). Hydraulic oil leaking out of the passages 146 and 148 into the interior of the housing 110/112 is prevented from leaking out of the housing by input and output shaft seals 150 and 152, and is drained from the interior of the housing 110/112 by any suitable means such as a suction pump (not shown) returning the oil to a reservoir (not shown) or to the input of a high-pressure supply pump (not shown).

It will thus be readily seen that rotation of the input shaft 114 causes matching rotation of the input member 122 and hence also of the eccentric 124 coupled thereto. Rotation of the eccentric 124 causes the gear-wheel 136 to gyrate round the inside of the ring 140. To convert this gyratory motion of the gear-wheel 124 into rotation of the ring 140 and hence also into rotation of the output member 130 coupled thereto, an internally toothed ring 154 is rigidly secured to the housing 110/112, co-axial with respect to the ring 140, and also with respect to the input shaft 114 and the input member 122. The ring 154 has forty gear teeth and meshes with the gear-wheel 136 in similar manner to the meshing of the ring 140 with the gear-wheel 136. Although the pitch circle diameters of the rings 140 and 154 differ by about two and one-half percent, the slight mis-mesh caused by the gear-wheel 136 meshing with unequal-diameter toothed rings may be readily accomodated. However, if perfectly accurate meshing is desired, a further gear-wheel (not shown) may be coupled to the gear-wheel 136 for conjoint rotation therewith and so as to mesh with the ring 154, this further gear-wheel having thirtythree teeth. Because the ring 154 is rigidly mounted with respect to the housing 110/112, each revolution of the input shaft 114 and hence of the eccentric 124 will cause the gear-wheel 136 to gyrate once round the rings 140 and 154 and advance the ring 140 by two teeth (one twentyfirst of a revolution). Thus the gear arrangement of the gear-wheel 136 and the toothed rings 140 and 154 constitutes a twentyone-to-one reduction gear-box with input and output rotation being in the same direction. (If the output were desired to rotate in the direction opposite to the direction of the input, the ring 154 could be provided with a greater number of gear teeth than the number of gear teeth on the ring 140, for example, fortytwo and forty respectively). Thus rotation of the input shaft 114 is converted to rotation of the output member 130 and hence also of an output shaft 156 formed integral with the output member 130.

In order that the torque provided by the output shaft 156 upon rotation of the input shaft 114 be augmented relative to that provided through the gearing 136, 140 and 154, an hydraulic vane motor is made integral with the output member 130 and is provided with a suitably directed hydraulic supply controlled by the input torque as sensed by the hydraulic control valve arrangement described with reference to FIG. 5. This motor is shown partly in FIG. 4 and more fully (though diagrammatically and not to scale) in FIG. 6.

The motor, as may be seen from FIG. 6, has three symmetrically disposed vanes 158 integral with the output member 130 and rotatable within a cylindrical part of the casing 110, the vanes 158 extending radially outwards from the output member 130 and sweeping out an annular volume of substantially square cross-section. Interdigitated with the vanes 158 are three symmetrically disposed static vanes 160 integral with the housing 110 and sub-dividing, together with the vanes 158, the annular volume into six annular segments 162, 164, 166, 168, 170 and 172. A passage 174 hydraulically interconnects the volumes 168 and 172, and passages 176 hydraulically interconnect the volumes 162, 166 and 170. Seals 178 prevent leakage between and out of the volumes 162–172.

A fluid flow divider 180 has its two outputs 182 and 184 respectively connected to the volumes 172 and 168, and to the volumes 162, 166, and 170. The two outputs 182 and 184 are also connected by respective passages 186 and 188 to the passages 146 and 148 of the hydraulic torque sensing arrangement 142/144 (see FIG. 5). The precise details of structure and function of the flow divider 180 may be obtained by reference to United Kingdom patent application No. 14889/75, and it suffices to say here that the flow divider has a defined two-diameter bore 190 which may be a drilling in the casing 110 for integral construction of the arrangement, and a spool member 192 reciprocable within the bore 190. According to the angular position of the tongue 142 in relation to the slot 144 (FIG. 5) as determined by the direction and magnitude of input torque applied to the input shaft 114, there will be a relative variation in the flows of hydraulic oil along the passages 146 and 148 which by way of the passages 186 and 188 varies the relative quantities of oil leaving the volumes 194 and 196, this oil arriving in the flow divider 180 from a high-pressure pump (not shown) by way of a common input port 198. Relative variation of the volumes of oil leaving the volumes 194 and 196 causes the spool member 192 to move in a direction to concentrate the input at port 198 towards the output 182 or 184 demanding the greater flow until balance conditions prevail, i.e. the motor has rotated the output shaft 156 by the requisite amount. An integral part of this hydraulic function is achieved by coupling the end volume 200 to the motor volume 164 by way of a conduit 202, the volume 164 providing a sensing and control function rather than a motor function. That is, if the output member 130 is rotating clockwise (FIG. 6), the volume 164 will expand to reduce the fluid pressure therein and also in volume 200. This pressure reduction in volume 200 assists in the movement of the spool member 192 to a position increasing fluid pressure to volume 172 to assist in the clockwise rotation of the output member 130. Thus the hydraulic vane motor shown in FIG. 6 and which is an integral part of the arrangement of FIG. 4, acts in response to sensed input torque to hydraulically augment the output torque of the output shaft 156. Thus the arrangement of FIGS. 4–6 may be employed for power assistance of vehicle steering as described with reference to FIGS. 1–3, or for other purposes.

An advantage of the illustrated motor arrangement is that the motor torque acts directly on the output member 130 and hence also directly on the output shaft 156, so not requiring gearing to be adequately strengthened to carry the motor torque as in prior art arrangements.

There may be variations in the form of the hydraulic motor, for example in the number and shape of the vanes, or alternative forms of hydraulic motor may be employed, for example, a piston and cylinder motor external to the torque sensing and gearing arrangement and preferably directly coupled to the object to be moved (e.g. the steering linkage of a motor vehicle). In the latter case the motor will be coupled to the body member through the structure of the vehicle or other arrangement in which the body member and motor are mounted, and the motor will be coupled to the rotatable ring and the output shaft through the intermediary of the steering or other linkage.

In place of the torque sensing arrangement 142/144 of FIG. 5 and the flow divider 180, there may be provided between the input shaft 114 and the input member 122 (or at any other suitable location in the power train between the input and output shafts) a device directly providing suitable motor hydraulic power inputs in accordance with sensed torque, such a device being for example the power assistance control device described in United Kingdom patent application No. 15332/75.

Other modifications and variations may be made within the scope of the invention; for example, the arrangement for converting gyratory motion of the gear-wheel 136 to rotation of the output shaft 156 may be the same as that employed in the FIGS. 1-3 arrangement instead of as shown in FIG. 4. In place of the fluid flow divider 180 shown in FIG. 6, there may alternatively be employed the fluid flow divider described with reference to FIG. 16 of United Kingdom Pat. No. 1431437.

I claim:

1. A power assisted actuating arrangement comprising a body member, an input shaft rotatable relative to said body member, an eccentric drivingly connected to said input shaft and rotatable therewith, a gear-wheel rotatably mounted on said eccentric, said gear-wheel meshing with an internally-toothed ring rotatably mounted in said body member and having a number of gear teeth which is greater than the number of gear teeth on said gear-wheel, an output shaft of said arrangement rotatably mounted in said body member, said ring being connected to said output shaft for rotation in unison therewith, means for constraining rotation of said gear-wheel upon gyration thereof due to rotation of said eccentric whereby rotation of the eccentric is accompanied by rotation of said ring, torque sensing means operable to produce in use a fluid pressure dependent on the torque applied to said input shaft, a fluid pressure motor means responsive to said fluid pressure, said motor means being drivingly connected to said output shaft whereby said motor means drives the output shaft to increase the torque derivable from said output shaft in response to rotation of the input shaft.

2. A power assisted actuating arrangement as claimed in claim 1, said torque sensing means being combined with the means for constraining rotation of said gear-wheel.

3. A power assisted actuating arrangement as claimed in claims 1 or 2, wherein said means for constraining rotation of said gear-wheel comprises means for anchoring said gear-wheel such as to permit gyration thereof while substantially preventing rotation thereof about its axis relative to the body member.

4. A power assisted actuating arrangement as claimed in claim 3, wherein the anchor means comprises an arm rigidly secured to the gear-wheel and extending radially outwards from the gear-wheel, a portion of the arm being constrained against lateral movement while being substantially free for axial and rotational movement to accommodate said gyration of the gear-wheel.

5. A power assisted actuating arrangement as claimed in claim 1, wherein the means for constraining rotation of the gear-wheel comprises a further internally-toothed ring secured to said body member thereby to be substantially non-rotatable with respect to said body member, said further ring having a number of gear teeth which is different from the number of gear teeth on the said ring, the teeth of said further ring meshing with the said gear-wheel.

6. A power assisted actuating arrangement as claimed in claim 4, said arm being connected with a valve mechanism operable to govern the supply of fluid pressure to the motor means.

7. A power assistance actuating arrangement as claimed in claim 1 or 5, wherein the input shaft is coupled to the eccentric via means which includes a valve mechanism operable to govern supply of fluid pressure to the motor means.

8. A power assistance actuating arrangement as claimed in claim 1, the motor means comprising a vane motor formed within said housing and incorporating the output shaft.

9. A power assistance actuating arrangement as claimed in claim 1, wherein the torque sensing means includes two valves connected in respective parallel flow paths from a fluid flow divider and acting complementarily in relation to the flow divider to concentrate fluid flow in the path at higher pressure, said motor means having input ports connected upstream of the respective valves.

* * * * *